United States Patent
Kleeberger et al.

(10) Patent No.: US 11,388,156 B2
(45) Date of Patent: Jul. 12, 2022

(54) PROOF-OF-WORK CONCEPT FOR A VEHICLE

(71) Applicant: Infineon Technologies AG, Neubiberg (DE)

(72) Inventors: Veit Kleeberger, Munich (DE); Alexander Zeh, Munich (DE)

(73) Assignee: Infineon Technologies AG

( * ) Notice: Subject to any disclaimer, the term of this patent is extended or adjusted under 35 U.S.C. 154(b) by 232 days.

(21) Appl. No.: 16/697,404

(22) Filed: Nov. 27, 2019

(65) Prior Publication Data

US 2020/0177569 A1 Jun. 4, 2020

(30) Foreign Application Priority Data

Nov. 29, 2018 (DE) .......................... 102018130297.5

(51) Int. Cl.
*H04L 9/40* (2022.01)
*H04L 9/32* (2006.01)
*H04L 67/12* (2022.01)

(52) U.S. Cl.
CPC ............ *H04L 63/08* (2013.01); *H04L 9/3247* (2013.01); *H04L 63/123* (2013.01); *H04L 67/12* (2013.01)

(58) Field of Classification Search
CPC ..... H04L 63/08; H04L 9/3247; H04L 63/123; H04L 67/12; H04L 63/0442; H04L 63/1458; H04L 9/3297; H04L 9/3239; H04L 2209/84; H04L 2209/805; H04L 2209/38; H04L 9/0825; H04W 4/48; G06F 21/64; G06F 11/3414
See application file for complete search history.

(56) References Cited

U.S. PATENT DOCUMENTS

| 8,667,288 | B2 | 3/2014 | Yavuz | |
|---|---|---|---|---|
| 9,288,048 | B2* | 3/2016 | Han | .................... H04L 9/3242 |
| 11,030,594 | B2* | 6/2021 | Ju | ....................... A63F 13/792 |
| 2014/0223048 | A1 | 8/2014 | Troeger | |
| 2017/0286675 | A1* | 10/2017 | Shin | .................... H04L 63/1416 |
| 2018/0144340 | A1 | 5/2018 | Kinnaird et al. | |
| 2018/0304858 | A1 | 10/2018 | Neff et al. | |
| 2020/0092107 | A1* | 3/2020 | Cole | ................... G06Q 20/3825 |

FOREIGN PATENT DOCUMENTS

| CN | 104509027 A | 4/2015 |
|---|---|---|
| DE | 102014101338 A1 | 8/2014 |
| DE | 102016225425 A1 | 6/2017 |
| DE | 102017203202 A1 | 8/2018 |

OTHER PUBLICATIONS

Wikipedia, "Proof of Work", [online] Oct. 19, 2019, pp. 1-5, [online] URL: <https://en.wikipedia.org/w/index.php?title=Proof_of_work&oldid=922048362>.

* cited by examiner

*Primary Examiner* — Mohammed Waliullah
(74) *Attorney, Agent, or Firm* — Design IP

(57) ABSTRACT

A method for providing a Proof-of-Work concept in a vehicle is provided. The vehicle includes a network including at least three control units, where a first control unit sends a first message to a second control unit, the second control unit sends a second message including the first message to a third control unit, and the third control unit determines a Proof-of-Work for the second message based on at least one vehicle-specific characteristics of the network. Also, an corresponding system as well as a vehicle including such system are provided.

23 Claims, 4 Drawing Sheets

Fig.2

| From...To... | ECU 101 | ECU 102 | ECU 103 | ECU 104 | ECU 105 |
|---|---|---|---|---|---|
| ECU 101 | 201 | 202 | 203 | 204 | 205 |
| ECU 102 | 206 | 207 | 208 | 209 | 210 |
| ECU 103 | 211 | 212 | 213 | 214 | 215 |
| ECU 104 | 216 | 217 | 218 | 219 | 220 |
| ECU 105 | 221 | 222 | 223 | 224 | 225 |

Fig.3

| From...To... | ECU 101 | ECU 102 | ECU 103 | ECU 104 | ECU 105 |
|---|---|---|---|---|---|
| ECU 101 | 0 | 1 | 1 | 0 | 0 |
| ECU 102 | 1 | 0 | 1 | 0 | 0 |
| ECU 103 | 1 | 1 | 0 | 0 | 1 |
| ECU 104 | 0 | 0 | 0 | 0 | 1 |
| ECU 105 | 0 | 0 | 1 | 1 | 0 |

PROOF-OF-WORK CONCEPT FOR A VEHICLE

FIELD

Embodiments of the present invention relate to a Proof-of-Work verification concept implemented in a vehicle.

BACKGROUND

Functional safety and cybersecurity are important aspects of the growing in-vehicle electronic systems. Block chains (BCs) have recently gained attention due to their popularity in applications as cryptocurrencies. However, several other use cases exist for BCs, for example, Internet-of-Things (IoT).

Proof-of-Work (PoW) concepts have been developed to prevent Denial-of-Service (DoS) attacks.

A PoW system (or protocol, or function) is an economic measure to deter denial of service attacks and other service abuses such as spam on a network by requiring some work from the service requester, usually meaning processing time by a computer.

These concepts are the basis of block chains. The most prominent PoW is a cryptographic hash puzzle as it is used in the BitCoin Block Chain: The basic principle is to solve a computational problem, which can be easily verified. For the hash puzzle, one has to find a nonce such that the hash, that includes the nonce, has to fulfil certain requirements.

The hash puzzle can be described as follows: A known portion A (e.g., a portion of bits or bytes) and an unknown portion B (said nonce) are concatenated to "AB" and are fed to a one-way function (the hash function) that provides a result C, i.e. the hash value. If an attacker knows the portion A and the hash value C, the portion B can only be guessed by feeding all possible combinations B* for the portion B concatenated with the known portion A into AB* to the one-way function and checking whether a result C* provided by the one-way function equals the known hash value C.

The proof of work is a requirement to define an expensive computer calculation (also referred to as mining). In the above example, the PoW is the multitude of calculations determining the results C* to finally arrive at the hash value C. Hence, the hash value is determined via the hash function in a quick and easy way, whereas the opposite direction—to obtain the portion B—requires a significant amount of processing (time). The portion B cannot be calculated directly in a deterministic way.

SUMMARY

An objective is to improve existing solutions and in particular to provide an efficient solution to increase cybersecurity and/or functional safety in a vehicle.

This may be solved according to the features of the independent claims. Further embodiments result from the depending claims.

The examples suggested herein may in particular be based on at least one of the following solutions. Combinations of the following features may be utilized to reach a desired result. The features of the method could be combined with any feature(s) of the device, apparatus or system or vice versa.

A method is suggested for providing a Proof-of-Work (PoW) concept in a vehicle that includes a network including at least three control units. A first control unit sends a first message to a second control unit, the second control unit sends a second message, including the first message, to a third control unit, and the third control unit determines a Proof-of-Work for the second message based on at least one vehicle-specific characteristics of the network.

The second message including the first message may also be interpreted as "a second message together with the first message". The second message (including the first message) enables a beneficial Proof-of-Work concept in the automotive field, because each of the control units is deployed at a fixed location (and is thereby deterministic with regard to latencies) within or at the vehicle. This may efficiently utilize the vehicle-specific characteristics to determine the Proof-of-Work. Beneficially these control units are connected to the network, which may be a communication network, e.g., an automotive bus system.

The Proof-of-Work concept hence allows determining the Proof-of-Work, i.e. to verify that the message received comes from an entitled control unit that is supposed to have sent this message. Hence, by verifying the message, the sending control unit can be confirmed in its entitlement. If the Proof-of-Work cannot be verified, the message may have originated from a non-entitled entity (e.g., an attacking device that has been connected to the network) that is not a valid control unit. As a consequence, any such message can be disregarded and/or an alarm event can be triggered. This approach allows checking the authenticity of messages sent from entitled control units of the network as well as rejecting messages that may be launched as Denial-of-Service attacks with the intention to hamper network communication and processing of the control units.

The Proof-of-Work concept described herein may thus also be regarded as "proof-of-network integrity". The Poof-of-Work is based on at least one vehicle-specific characteristics of the in-vehicle network. Such characteristics may consider latencies caused by the control units and the network topology and/or up/down times of the respective control unit. The up time indicates a time (duration) of the control unit being active and the down time indicates a time (duration) of the control unit being inactive (or in a standby-mode).

Contrary to existing Proof-of-Work concepts, the current solution utilizes the fact that the Proof-of-Work is determined based on at least one vehicle-specific characteristics that cannot be successfully broken by known brute-force attacks purely based on computing power.

The first and second message may each also be regarded as Proof-of-Work message. The second message shows the concept of chaining messages that allows any receiving control unit to verify the Proof-of-Work concept (or become aware that there is a violation of the Proof-of-Work concept).

Advantageously, there can be more than three control units. These more than three control units utilize the described concept by compiling and sending an additional message that includes the received second message (which includes the first message). This sort of embedded messaging may be utilized throughout the network from one sending control unit to a (final) receiving control unit. The receiving control unit in this example may be any control unit or a control unit that cannot reach another control unit which has not yet acted as a sending control unit with regard to the current Proof-of-Work chain.

The approach described herein may advantageously utilize a Proof-of-Work concept in a vehicle to prevent Denial-of-Service (DoS) attacks. It beneficially uses physical properties (e.g., latency) of an in-vehicle communication network. This also allows detecting of a non-entitled ECU that has been infiltrated by an attacker.

This solution is in particular scalable, it can be used for different networks. Also, a level of the Proof-of-Work can be adjusted, e.g., by adding security and/or additional information like control unit identification (ID).

Another advantage is that the Proof-of-Work concept introduced herein is not based on calculation complexity and is therefore not subject to attacks that require computational power. Hence, it is not prone to attacks that may be imminent due to quantum computers.

According to an embodiment, the control units are electronic control units, which are connected via the network, in particular via a bus system.

According to an embodiment, the vehicle-specific characteristics includes a latency between the control units.

According to an embodiment, the latency is predetermined to lie within a latency window.

The Proof-of-Work concept described may utilize at least one transmission time threshold, in particular an upper latency threshold and a lower latency threshold that lead to a latency window (i.e. a transmission time range). This approach is referred to as "latency", wherein such latency may be determined based on at least one latency threshold. Hence, a comparison with a predefined latency can be carried out to determine whether or not the transmission time meets a latency criterion.

The latency may be determined for each direct connection between two ECUs, which may be represented, e.g., by entries carrying the value "1" in a PoW-matrix.

The latency window is in particular a transmission latency window defined by an upper and a lower threshold that indicates how long the message should usually take to be conveyed between two control units. If it takes longer or shorter than defined by such latency window, it may be a violation of the message, the sender and/or the integrity of the network.

According to an embodiment, the first message includes a first timestamp issued by the first control unit and the second message includes a second timestamp issued by the second control unit, wherein the third control unit issues a third time stamp when the second message is received and determines whether the transmission time of the messages lies within the latency window based on the timestamps or a portion of the timestamps.

Hence, the messages are chained together such that each subsequent message includes the previous message. The timestamps can be used to determine the transmission times between control units and to determine whether such transmission times fall within, e.g., the latency window.

According to an embodiment, each of the messages includes a signature of the sending control unit.

The signature can be verified by any receiving control unit. Public-key cryptography can be used to sign messages and verify signatures. It is also an option that symmetric cryptography is used; for example, message authentication codes can be used for signing and/or verifying purposes.

According to an embodiment, more than two control units of the network utilize the chained messaging, wherein one control unit sends a message to another control unit, which has not yet been reached or which has not been reached a predetermined number of time.

Hence, the messaging allows sending messages throughout the network following the topology of the network until all or a predefined subset of control units have been reached. It is an option that the control units or a portion of the control units need to be reached a predetermined number of times.

According to an embodiment, the Proof-of-Work for the second message is determined by authenticating the first control unit and the second control unit based on the second message.

According to an embodiment, the first message and/or the second message include payload data.

Each of the message may include payload data, which may be any information or control data that is to be transmitted across the network and may be processed and/or forwarded by a receiving control unit.

Also, a system is suggested for providing a Proof-of-Work concept in a vehicle, including a network including at least three control units,
wherein a first control unit is arranged to send a first message to a second control unit,
wherein the second control unit is arranged to send a second message including the first message to a third control unit,
wherein the third control unit is arranged to determine a Proof-of-Work for the second message based on at least one vehicle-specific characteristics of the network.

Further, a vehicle is suggested including the system as described herein.

BRIEF DESCRIPTION OF THE DRAWINGS

Embodiments are shown and illustrated with reference to the drawings. The drawings serve to illustrate the basic principle, so that only aspects necessary for understanding the basic principle are illustrated. The drawings are not to scale. In the drawings the same reference characters denote like features.

FIG. 2 shows an exemplary communication matrix (K-Matrix) referring to the communication between the ECUs of the topology shown in FIG. 1;

FIG. 3 shows a PoW-matrix that may be determined based on the K-Matrix shown in FIG. 2;

DETAILED DESCRIPTION

Figure 1:
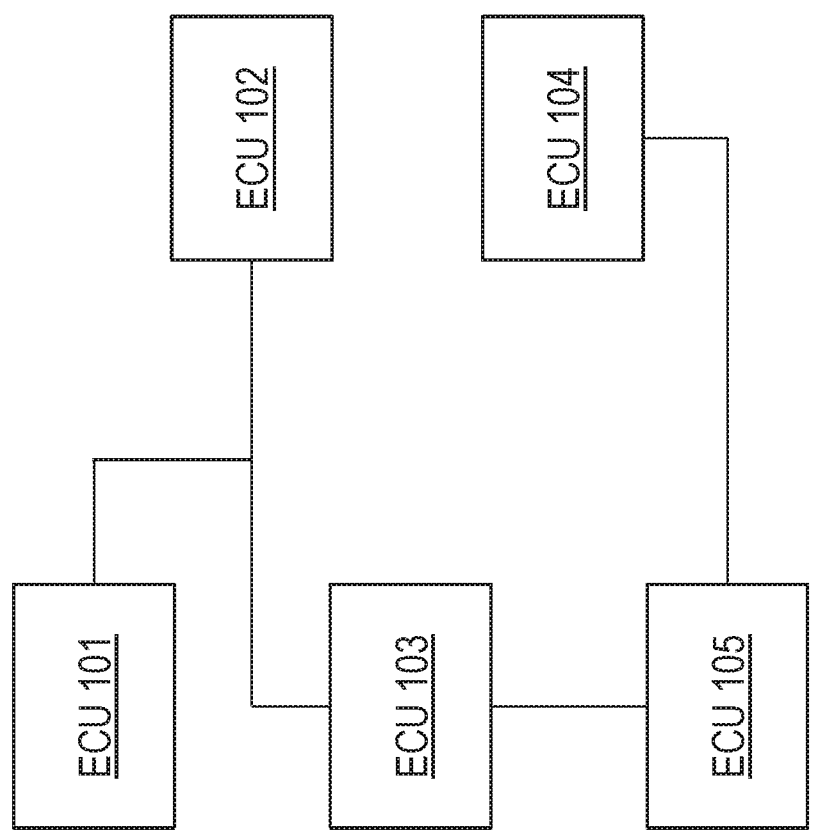
FIG. 1 shows an exemplary automotive in-vehicle network comprising several Electronic Control Units (ECUs)

FIG. 1 shows an exemplary automotive in-vehicle network comprising several Electronic Control Units (ECUs) 101 to 105. The latencies of the in-vehicle network are known as the ECUs 101 to 105 are fixed at pre-determined positions inside the vehicle. The in-vehicle network may be any network or bus comprising, e.g., a Controller Area Network (CAN), a FlexRay or an Ethernet.

FIG. 2 shows a communication matrix (also referred to as "K-Matrix") describing the communication between the ECUs 101 to 105. Hence, the K-Matrix shows the communication structure within the in-vehicle network. Additional properties may be stored in the K-Matrix, e.g., number of messages, content to be exchanged between ECUs, latency bounds (upper and lower latencies), timing restrictions, sending intervals, etc.

It is noted that a communication from a particular ECU to itself is also possible.

In the K-Matrix of FIG. 2, the fields 201 to 225 may carry entries defining details of the communication between two ECUs. For example, the field 202 indicates a communication from the ECU 101 to the ECU 102. Such communication may comprise, e.g., "10 messages", "heartbeat at a rate of 1 time per microsecond", etc. This may apply for different communication paths of the in-vehicle network accordingly. It is noted that the field 206 indicates a communication from the ECU 102 to the ECU 101, which may contain different or at least partially the same entries.

FIG. 3 shows a PoW-matrix that may be determined based on the K-Matrix shown in FIG. 2. Communication paths from the K-Matrix may be used to define the PoW-matrix.

Also, the PoW-matrix can be determined based on the communication paths between the ECUs 101 to 105 in the network. In the PoW-matrix, "1" indicates that there is a connection between the affected ECUs.

For example, the ECU 103 is connected to the ECU 101, the ECU 102 and the ECU 105, but it is not connected to the ECU 104. Hence the fourth line of the table of FIG. 3 shows a value "1" for the ECUs to which the ECU 103 is connected and a value "0" for the ECU 103 (because it is not connected to itself) and the ECU 104.

In other words, the PoW-matrix of FIG. 3 shows "1" values for connections between ECUs. The connection thereby exemplarily indicates a bidirectional connection.

It is an option that the communication between the nodes, i.e. the ECUs 101 to 105 of the in-vehicle network is not symmetric. For example, the ECU 102 may be reached only from the ECU 103, but not from the ECU 101; in this case, the ECU 101 has transmitted a message via the ECU 103 to reach the ECU 102.

The PoW concept for the in-vehicle network may utilize at least one transmission time threshold, in particular an upper latency threshold and a lower latency threshold that lead to a latency window (i.e. a transmission time range). This approach may be referred to as "latency", which may be determined based on at least one latency threshold. The latency may be determined for each direct connection between ECUs, i.e. entries carrying the value "1" in the PoW-matrix of FIG. 3.

According to an example, a single ECU sends a message to a predetermined number of m other ECUs, wherein m<n are adjacent ECUs and n is the number of nodes (i.e. ECUs) of the in-vehicle network.

Each ECU receiving a message, signs the message (or a part of it). At the end of the PoW concept, the destination ECU receives m signatures from m preceding ECUs.

The destination ECU as well as any participating ECU on the path from a starting ECU towards the destination ECU is able to verify the signature(s) and the latency/latencies. The PoW thus needs a certain amount of time to reach the destination ECU due to the transmission time. Based on the latencies, this transmission time can be verified and is therefore a unique PoW of the in-vehicle network.

It is also an option that the message received by the destination ECU is conveyed back to the originating ECU so that the originating ECU is able to verify the PoW.

The PoW results in a deterministic amount of time due to the latencies (i.e. the respective transmission times) of the messages between the participating ECUs.

The PoW-matrix shown in FIG. 3 hence visualizes edges between nodes (ECUs) participating in the PoW within the vehicle, which are fixed (i.e. do not change) during the operation time of the vehicle: The positions of the ECUs are fixed and the wiring between the ECUs is also fixed.

As described, the latency between two ECUs participating in the PoW concept is used. Also, other properties, e.g., a message identification (ID), can be used in combination with the latency.

Advantageously, asymmetric cryptography can be used. If the participating ECUs involved in the PoW concept each has (at least) one public-private key pair, the message can be signed using the private key and such signature can be verified by any other ECU using the public key of the ECU that signed the message.

The n public keys can be exchanged among the participating ECUs and/or they may be stored in a central entity to which the ECUs have access.

It is noted that any ECU participating in the PoW chain is able to check the PoW by verifying the signed messages using the public key(s).

Cryptographic key distribution may be required to ensure secure CAN communication according to SecOC [see: www.autosar.org]. Such keys can be re-used for the PoW concept described herein. As an option, also other keys for Ethernet security can be re-used for the PoW concept described herein.

As another option, each of the nodes (ECUs) visited may randomly select the next node (ECU) to be visited based on the PoW-matrix.

Figure 4:
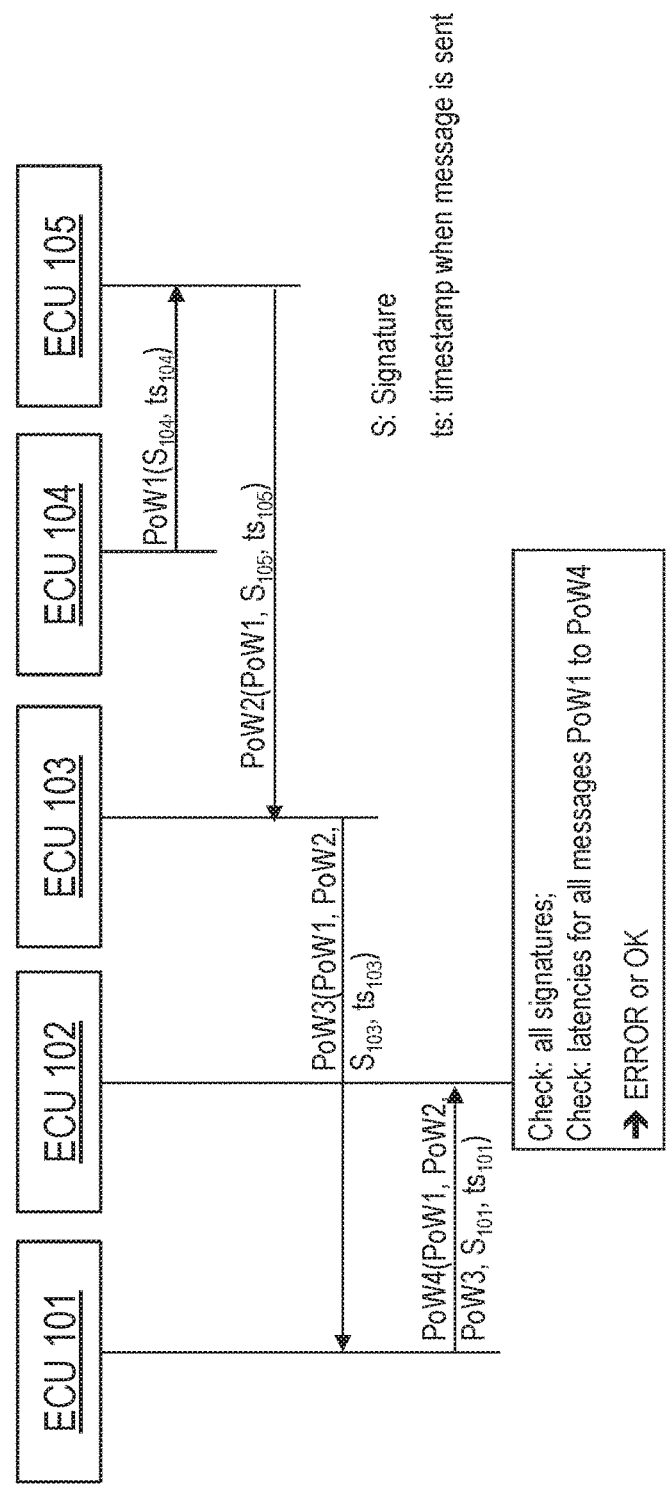
FIG. 4 shows an exemplary message chart diagram that is based on the topology shown in FIG. 1 in combination with the PoW-matrix of FIG. 3.

FIG. 4 shows an exemplary message chart diagram that is also based on the automotive in-vehicle network shown in FIG. 1 in combination with the PoW-matrix of FIG. 3. The latencies for each connection between two ECUs may be stored centrally or with each of the ECUs; i.e. each ECU is able to determine the latency of the transmission time, which may have to lie within a latency window (or range), which is defined by a lower latency threshold and an upper latency threshold (hence, each connection may have a different latency resulting in a different latency window). As an option, a signature may be provided by the originating ECU. A timestamp may be based on an internal clock of the ECU, wherein the internal clocks of the ECUs may preferably be synchronized. The internal clocks of the ECUs may also be secured and provide a secure time information.

The message chart of FIG. 4 may comprise the following steps:

1) The ECU 104 initiates the PoW concept. A candidate to receive a PoW message from the ECU 104 is the ECU 105. Hence, the ECU 104 conveys a message PoW1($S_{104}$, $ts_{104}$) to the ECU 105, wherein $S_{104}$ is the signature of the ECU 104 and $ts_{104}$ is a timestamp issued by the ECU 104 (i.e. a timestamp of the sender). It is noted that the ECU 101 to 105 have synchronized clocks.

2) The ECU 103 and the ECU 104 are potential candidates to receive a message from the ECU 105. As the ECU 104 is already part of the PoW concept, the ECU 105 sends a message PoW2(PoW1, $S_{105}$, $ts_{105}$) including the message PoW1 to the ECU 103, wherein $S_{105}$ is the signature of the ECU 105 and $ts_{105}$ is a timestamp issued by the ECU 105.

3) The ECU 101, the ECU 102 and the ECU 105 are potential addressees for the ECU 103. As the PoW messages were provided by the ECU 105, the ECU 103 randomly (or pseudo-randomly or deterministically) selects any of the ECU 101 or ECU 102 as an addressee to convey the PoW message to. In this example, the ECU 103 conveys a message PoW3(PoW1, PoW2, $S_{103}$, $ts_{103}$) message to the ECU 101, which comprises the messages PoW1 and PoW2 as well as a signature $S_{103}$ of the ECU 103 and a timestamp $ts_{103}$ of the ECU 103.

4) The ECU 101 may select the ECU 103 or the ECU 102 as potential addressees. The ECU 103 is already contained in the PoW concept. Hence, the ECU 101 sends a message PoW4(PoW1, PoW2, PoW3, $S_{101}$, $ts_{101}$) to the ECU 102, which comprises the messages PoW1, PoW2 and PoW3 as well as a signature $S_{101}$ of the ECU 101 and a timestamp $ts_{101}$ of the ECU 101.

5) The ECU 102 receives the message PoW4. The ECU 102 verifies the signatures $S_{104}$, $S_{105}$, $S_{103}$ and $S_{101}$ using the publicly available keys of the other ECUs. In addition, the ECU 102 checks the latencies of all messages POW1 to PoW4 based on, e.g., an upper latency threshold and a lower latency threshold for each of the connections. For example, each of the connections indicated by the PoW-matrix shown in FIG. 3 may determine a latency window by defining an upper threshold indicating a transmission time that should not be exceeded and a lower threshold that determines a minimum transmission time to be reached. The latency per connection (link) can be determined by the ECU 102 based on the respective transmission times, the latency window can be stored in a globally accessible storage and/or with each of the ECUs. The ECU 102 thus is able to determine:

whether or not a duration $ts_{105}$-$ts_{104}$ is within the latency window for the connection between the ECU 104 and the ECU 105, whether or not a duration $ts_{103}$-$ts_{104}$ is within the latency window for the connection between the ECU 103 and the ECU 105, whether or not a duration $ts_{101}$-$ts_{103}$ is within the latency window for the connection between the ECU 101 and the ECU 103, and whether or not a duration $ts_{102}$-$ts_{101}$ is within the latency window for the connection between the ECU 101 and the ECU 102, wherein $ts_{102}$ is the timestamp determined by the ECU 102 at the time the message PoW4 is received.

If all signatures are verified and if all the durations are verified to stay within the transmission time boundaries defined by the latency windows, the ECU 102 is able to verify the PoW. If any of the conditions mentioned is not fulfilled the ECU 102 will indicate a warning and/or trigger a predefined operation, e.g., issuing an alarm notification, starting fault processing or the like.

It is an option that the ECU 102 does not have to calculate the time differences for all connections. Instead it can calculate the duration $ts_{102}$-$ts_{104}$ and determine whether the resulting transmission time lies within a latency window that is calculated from the latency windows of the preceding connections.

As another option, each of the ECUs 105, 103 and 101 are capable of verifying the PoW as it is described for the ECU 102, which in this example is at the end of the PoW chain. For example, the ECU 101 is able to verify the PoW based on the message PoW.

It is noted that the PoW concept described herein starts at a particular ECU (here, e.g., the ECU 104) and is executed until the last ECU (i.e. the ECU 102) of the in-vehicle network is reached. Hence, the PoW concept propagates along the in-vehicle network and eventually reaches at least one ECU (node) that is at the end of the chain. This at least one ECU is able to verify the PoW or it is able to indicate that the verification has failed.

It is noted that if more than one ECU may be selected as addressee, the decision which ECU to select may be based on any random, pseudo-random or even deterministic function.

Different hardware units may be supported and/or beneficially utilized, e.g., in particular at least one of the following:

a cryptographic key storage unit;

an accelerator for cryptographic operations;

any communication peripheral (e.g. CAN) support for embedding the PoW concept into messages and/or to provide PoW messages; and/or a secure separation support from a PoW software (e.g., an execution platform comprising a CPU) to communication peripherals (e.g. a Controller Area Network, CAN); this may be realized, e.g., by a dedicated Direct Memory Access (DMA) engine.

The difficulty of the PoW concept can be modified by flexibly adjusting the number m of visited nodes (ECUs). Also, a combination of any of the variants described above can be utilized. It is another option that multiple rounds of visited nodes can be used, i.e. at least one node may be visited several times thereby increasing the length of the PoW chain.

Examples presented herein introduce a PoW concept that relies on physical properties (e.g., latency) of a rather stationary network. This PoW concept is in particular applied in the automotive field utilizing in-vehicle networks. Also, this PoW concept can serve as a basis for an automotive block chain.

In one or more examples, the functions described herein may be implemented at least partially in hardware, such as specific hardware components or a processor. More generally, the techniques may be implemented in hardware, processors, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, embedded Flash, external Flash, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium, i.e., a computer-readable transmission medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Instructions may be executed by one or more processors, such as one or more central processing units (CPU), digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a single hardware unit or provided by a collection of interoperative hardware units, including one or more processors as described above, in conjunction with suitable software and/or firmware.

Although various exemplary embodiments of the invention have been disclosed, it will be apparent to those skilled in the art that various changes and modifications can be made which will achieve some of the advantages of the invention without departing from the spirit and scope of the invention. It will be obvious to those reasonably skilled in the art that other components performing the same functions may be suitably substituted. It should be mentioned that features explained with reference to a specific figure may be combined with features of other figures, even in those cases in which this has not explicitly been mentioned. Further, the methods of the invention may be achieved in either all software implementations, using the appropriate processor instructions, or in hybrid implementations that utilize a combination of hardware logic and software logic to achieve the same results. Such modifications to the inventive concept are intended to be covered by the appended claims.

What is claimed is:

1. A method for providing Proof-of-Work verification in a vehicle that comprises a network comprising at least three controllers, the method comprising:
    transmitting, by a first controller, a first message to a second controller, wherein the first message comprises a first timestamp issued by the first controller;
    transmitting, by the second controller, a second message comprising the first message to a third controller, wherein the second message comprises a second timestamp issued by the second controller and the first timestamp included in the first message;
    determining, by the third controller, a Proof-of-Work for the second message based on at least one vehicle-specific characteristic of the network;
    issuing, by the third controller, a third time stamp when the second message is received by the third controller; and
    determining, by the third controller, the Proof-of-Work based on whether a transmission time of at least one of the first and the second messages lies within a latency window based on at least one of the first, the second, and the third timestamps.

2. The method according to claim 1, wherein the at least three controllers are electronic control units, which are connected via the network via a bus system.

3. The method according to claim 1, wherein the at least one vehicle-specific characteristic comprises a latency between the at least three controllers.

4. The method according to claim 3, wherein the latency is predetermined to lie within the latency window.

5. The method according to claim 4, method further comprising:
    determining, by the third controller, whether a transmission time of the first and the second messages lies within the latency window based on the first, the second, and the third timestamps.

6. The method according to claim 4, method further comprising:
    determining, by the third controller, whether a transmission time of the first and the second messages lies within the latency window based on at least one of the first, the second, and the third timestamps.

7. The method according to claim 1, wherein the first message comprises a signature of the first controller and the second message comprises a signature of the second controller.

8. The method according to claim 1, wherein more than two controllers of the at least three controllers utilize chained messaging, wherein the more than two controllers are sequentially arranged along a communication path such that one controller transmits a message to another controller that has not yet been reached or that has not been reached a predetermined number of times.

9. The method according to claim 1, further comprising:
    determining the Proof-of-Work for the second message by authenticating the first controller and the second controller based on the second message.

10. The method according to claim 1, wherein at least one of the first message and the second message comprise respective payload data.

11. The method according to claim 1, wherein:
    the at least one vehicle-specific characteristic comprises a latency of the network,
    determining the Proof-of-Work comprises determining the Proof-of-Work based on the latency of the network and based on the first and the second time stamps.

12. The method according to claim 1, wherein:
    the first message comprises a first signature of the first controller and a first timestamp issued by the first controller, and
    the second message comprises a second signature of the second controller, a second timestamp issued by the second controller, the first signature included in the first message, and the first timestamp included in the first message.

13. A system for providing Proof-of-Work verification in a vehicle, comprising:
    a network comprising at least three controllers, including a first controller, a second controller, and a third controller,
    wherein the first control unit is configured to transmit a first message to the second controller, wherein the first message comprises a first timestamp issued by the first controller, wherein the second controller is configured to transmit a second message comprising the first message to the third controller, wherein the second message comprises a second timestamp issued by the second controller and the first timestamp included in the first message, and wherein the third controller is configured to determine a Proof-of-Work for the second message based on at least one vehicle-specific characteristic of the network, wherein the third controller is configured to issue a third time stamp when the second message is received by the third controller and determine the Proof-of-Work based on whether a transmission time of at least one of the first and the second messages lies within a latency window based on at least one of the first, the second, and the third timestamps.

14. The system according to claim 13, wherein the at least three controllers are electronic control units, which are connected via the network via a bus system.

15. The system according to claim 13, wherein the at least one vehicle-specific characteristic comprises a latency between the at least three controllers.

16. The system according to claim 15, wherein the latency is predetermined to lie within the latency window.

17. The system according to claim 16, wherein:
the third controller is configured to determine whether a transmission time of the first and the second messages lies within the latency window based on the first, the second, and the third timestamps.

18. The system according to claim 16, wherein:
the third controller is configured to determine whether a transmission time of the first and the second messages lies within the latency window based on at least one of the first, the second, and the third timestamps.

19. The system according to claim 13, wherein the first message comprises a signature of the first controller and the second message comprises a signature of the second controller.

20. The system according to claim 13, wherein more than two controllers of the at least three controllers utilize chained messaging, wherein the more than two controllers are sequentially arranged along a communication path such that one controller transmits a message to another controller that has not yet been reached or that has not been reached a predetermined number of times.

21. The system according to claim 13, wherein the third controller is configured to determine the Proof-of-Work for the second message by authenticating the first controller and the second controller based on the second message.

22. A vehicle, comprising:
a network comprising at least three controllers, including a first controller, a second controller, and a third controller, wherein the first control unit is configured to transmit a first message to the second controller, wherein the first message comprises a first timestamp issued by the first controller, wherein the second controller is configured to transmit a second message comprising the first message to the third controller, wherein the second message comprises a second timestamp issued by the second controller and the first timestamp included in the first message, and wherein the third controller is configured to determine a Proof-of-Work for the second message based on at least one vehicle-specific characteristic of the network, wherein the third controller is configured to issue a third time stamp when the second message is received by the third controller and determine the Proof-of-Work based on whether a transmission time of at least one of the first and the second messages lies within a latency window based on at least one of the first, the second, and the third timestamps.

23. A method for providing Proof-of-Work verification in a vehicle that comprises a network comprising at least three controllers, the method comprising:
transmitting, by a first controller, a first message to a second controller, wherein the first message comprises a first timestamp issued by the first controller;
transmitting, by the second controller, a second message comprising the first message to a third controller, wherein the second message comprises a second timestamp issued by the second controller and the first timestamp included in the first message;
determining, by the third controller, a Proof-of-Work for the second message based on at least one vehicle-specific characteristic of the network;
issuing, by the third controller, a third time stamp when the second message is received by the third controller; and
determining, by the third controller, the Proof-of-Work based on:
whether a first transmission time of the first message lies within a first latency window based on the first and the second timestamps, and
whether a second transmission time of the second message lies within a second latency window based on the second and the third timestamps.

* * * * *